US010671626B2

(12) United States Patent
Dray et al.

(10) Patent No.: US 10,671,626 B2
(45) Date of Patent: Jun. 2, 2020

(54) IDENTITY CONSOLIDATION IN HETEROGENEOUS DATA ENVIRONMENT

(71) Applicant: salesforce.com, inc., San Francisco, CA (US)

(72) Inventors: Alan S. Dray, Spencerport, NY (US); Mehmet G. Orun, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 525 days.

(21) Appl. No.: 15/277,832

(22) Filed: Sep. 27, 2016

(65) Prior Publication Data

US 2018/0089294 A1 Mar. 29, 2018

(51) Int. Cl.
G06F 16/25 (2019.01)

(52) U.S. Cl.
CPC .................... *G06F 16/25* (2019.01)

(58) Field of Classification Search
CPC combination set(s) only.
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,133 | B1 | 4/2001 | Masthoff |
| 6,216,135 | B1 | 4/2001 | Brodersen et al. |
| 6,233,617 | B1 | 5/2001 | Rothwein et al. |
| 6,236,978 | B1 | 5/2001 | Tuzhilin |
| 6,266,669 | B1 | 7/2001 | Brodersen et al. |
| 6,288,717 | B1 | 9/2001 | Dunkle |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |

(Continued)

*Primary Examiner* — Shyue Jiunn Hwa
(74) *Attorney, Agent, or Firm* — Schwabe Williamson & Wyatt

(57) ABSTRACT

In some implementations, a processing system of a database system may identify identification information associated with a user within a request, received from a client device, for data associated with the user, compare the identification information with user identity entries persisting on the memory device, determine, from the comparison, that a user identity entry persisting on the memory device is associated with the user, and query a backend database associated with the client device with one or more parameters included within the user identity entry to obtain the data associated with the user.

16 Claims, 9 Drawing Sheets

(56) References Cited

U.S. PATENT DOCUMENTS

| | | | |
|---|---|---|---|
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,411,949 B1 | 6/2002 | Schaffer | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec et al. | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshaysky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,907,566 B1 | 6/2005 | McElfresh et al. | |
| 7,062,502 B1 | 6/2006 | Kesler | |
| 7,069,231 B1 | 6/2006 | Cinarkaya | |
| 7,069,497 B1 | 6/2006 | Desai | |
| 7,100,111 B2 | 8/2006 | McElfresh et al. | |
| 7,181,758 B1 | 2/2007 | Chan | |
| 7,269,590 B2 | 9/2007 | Hull et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,373,599 B2 | 5/2008 | McElfresh et al. | |
| 7,401,094 B1 | 7/2008 | Kesler | |
| 7,406,501 B2 | 7/2008 | Szeto et al. | |
| 7,412,455 B2 | 8/2008 | Dillon | |
| 7,454,509 B2 | 11/2008 | Boulter et al. | |
| 7,508,789 B2 | 3/2009 | Chan | |
| 7,599,935 B2 | 10/2009 | La Rotonda et al. | |
| 7,603,331 B2 | 10/2009 | Tuzhilin et al. | |
| 7,603,483 B2 | 10/2009 | Psounis et al. | |
| 7,620,655 B2 | 11/2009 | Larsson et al. | |
| 7,644,122 B2 | 1/2010 | Weyer et al. | |
| 7,668,861 B2 | 2/2010 | Steven | |
| 7,698,160 B2 | 4/2010 | Beaven et al. | |
| 7,730,478 B2 | 6/2010 | Weissman | |
| 7,747,648 B1 | 6/2010 | Kraft et al. | |
| 7,779,039 B2 | 8/2010 | Weissman et al. | |
| 7,779,475 B2 | 8/2010 | Jakobson et al. | |
| 7,827,208 B2 | 11/2010 | Bosworth et al. | |
| 7,853,881 B1 | 12/2010 | Aly Assal et al. | |
| 7,945,653 B2 | 5/2011 | Zukerberg et al. | |
| 8,005,896 B2 | 8/2011 | Cheah | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,073,850 B1 | 12/2011 | Hubbard et al. | |
| 8,082,301 B2 | 12/2011 | Ahlgren et al. | |
| 8,095,413 B1 | 1/2012 | Beaven | |
| 8,095,531 B2 | 1/2012 | Weissman et al. | |
| 8,095,594 B2 | 1/2012 | Beaven et al. | |
| 8,103,611 B2 | 1/2012 | Tuzhilin et al. | |
| 8,150,913 B2 | 4/2012 | Cheah | |
| 8,209,308 B2 | 6/2012 | Rueben et al. | |
| 8,209,333 B2 | 6/2012 | Hubbard et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 9,355,155 B1* | 5/2016 | Cassel | G06F 21/552 |
| 2001/0044791 A1 | 11/2001 | Richter et al. | |
| 2002/0072927 A1* | 6/2002 | Phelan | G06Q 40/00 |
| | | | 705/35 |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2008/0249972 A1 | 10/2008 | Dillon | |
| 2009/0063415 A1 | 3/2009 | Chatfield et al. | |
| 2009/0089630 A1* | 4/2009 | Goldenberg | G06F 11/0769 |
| | | | 714/704 |
| 2009/0100342 A1 | 4/2009 | Jakobson | |
| 2009/0177744 A1 | 7/2009 | Marlow et al. | |
| 2011/0191303 A1* | 8/2011 | Kaufman | G06F 17/30286 |
| | | | 707/684 |
| 2011/0218958 A1 | 9/2011 | Warshaysky | |
| 2011/0247051 A1 | 10/2011 | Bulumulla | |
| 2012/0042218 A1 | 2/2012 | Cinarkaya | |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |

(56) References Cited

U.S. PATENT DOCUMENTS

| | | |
|---|---|---|
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0180882 A1* | 6/2014 | Berger ................... G06Q 30/06 |
| | | 705/30 |
| 2014/0359537 A1 | 12/2014 | Jackobson et al. |
| 2015/0249737 A1* | 9/2015 | Spievak ................ H04M 3/436 |
| | | 379/189 |
| 2017/0004487 A1* | 1/2017 | Hagen ................ G06O 20/4016 |
| 2017/0236060 A1* | 8/2017 | Ignatyev ................ G06N 5/02 |
| | | 706/46 |

* cited by examiner

IDENTITY CONSOLIDATION IN HETEROGENEOUS DATA ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to user identification in a database environment, and some implementations related to obtaining information associated with an identified user from heterogeneous data sources and generating a view of the obtained information.

BACKGROUND

In many industries it may be beneficial for a service provider to develop a profile of a customer to better serve the customer and understand the preferences of the customer. In a customer service environment, accessing previous orders or payment history may be used for response to customer interactions, while other data elements may be used to see trends in the orders of the customer and predict products or services that may be of interest to the customer for purchase.

Due to limited capabilities of different computer applications and updates to the computer applications, a service provider may utilize multiple different computer applications and multiple different versions of the computer applications to store the data associated with a customer. This often results in the customer data being stored in multiple different formats, with different means of accessing the data and different computer applications used for accessing each of the multiple different formats. Accordingly, to access the customer data, the service provider may be required to use multiple different computer applications to view the customer data, with the customer data being displayed in multiple different views and with varying different portions of the customer data provided in the multiple different views. This can be time consuming to open the multiple different computer applications for viewing the customer data and difficult to digest the customer data due to the multiple different views.

Further, each of the multiple different computer applications may store use different parameters for identifying stored data associated for a customer. For example, one computer application may identify stored data associated with the customer by searching for a name and email within the stored data for the stored data associated with the customer, while another computer application may search for a name and postal address within the stored data for the stored data associated with the customer. Accordingly, if a service provider does not have or enter all the different parameters for a customer when searching for the stored data associated with the customer, the search may not return all of the stored data associated with the customer.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
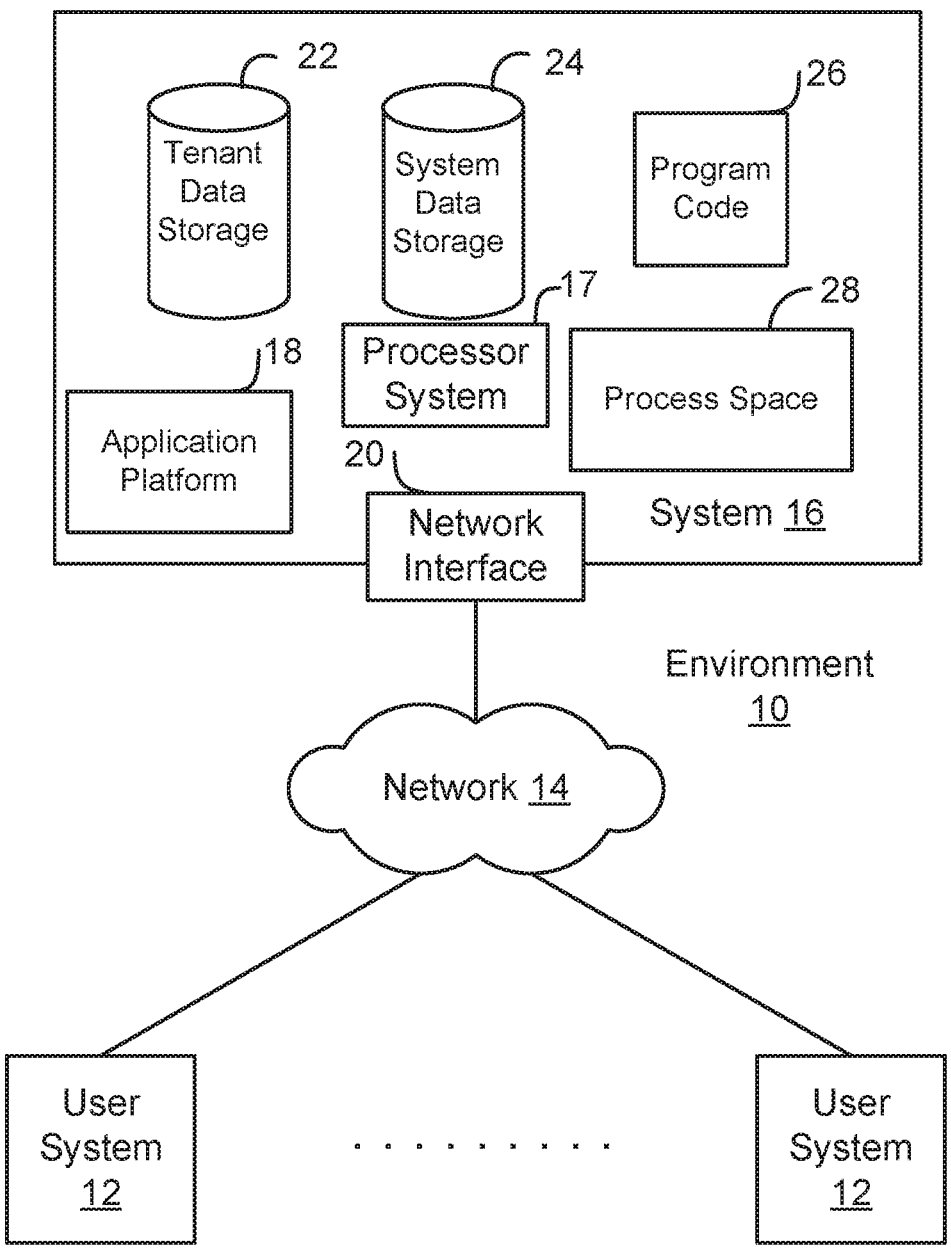
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for user identification and user data retrieval in a database environment.

In some implementations, a database system include a processing system and a memory device coupled to the processing system. The memory device may include instructions stored thereon that, in response to execution by the processing system, are operable to identify identification information associated with a user within a request, received from a client device, for data associated with the user, compare the identification information with user identity entries persisting on the memory device, determine, from the comparison, that a user identity entry persisting on the memory device is associated with the user, and query a backend database associated with the client device with one or more parameters included within the user identity entry to obtain the data associated with the user.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
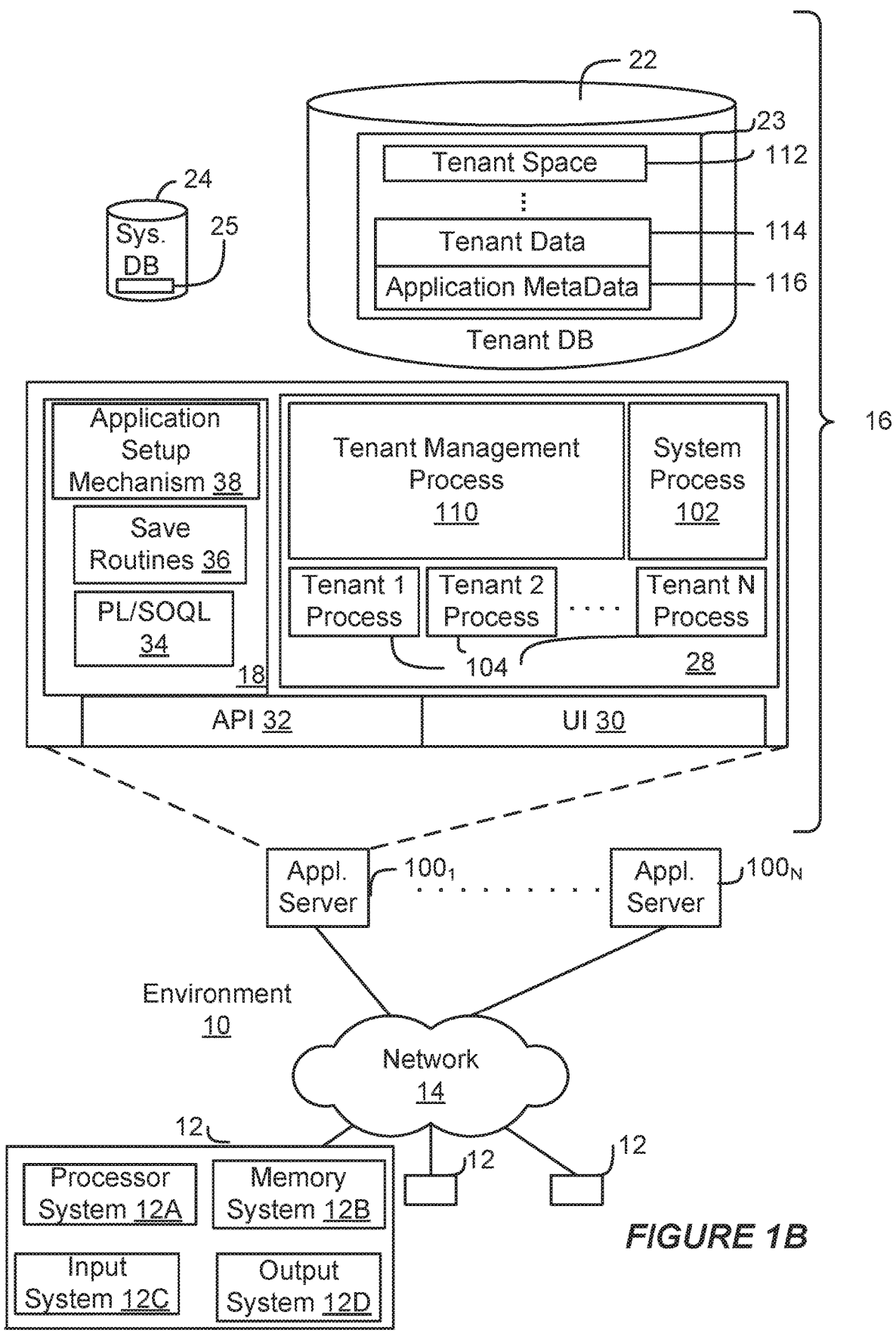
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG.

1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Introduction for Identity Consolidation

By the very nature of enterprise application architecture and information lifecycle, data about customer interactions may be distributed across different databases and applications. This distribution may lead to a common gap of not understanding the overall customer interactions in support of business activities, such as: Call Center support (where are all customers orders, payments, shipments, provisioning outcomes, service levels regardless of number of products or services they may have); Marketing (what is the best personalized marketing message content and timing based on customer's purchase, renewal, marketing response and case history); and Sales (what are all engagement touch points to optimize sales process, such as understanding of legal agreements including pricing agreements for subsidiary or parent companies, discovery and optimization of employee and partner engagement touch points)

Traditional approach to resolving this challenge was through the physical instantiation of a master data management hub, that would stage, match, reconcile, and instantiate all customer related account records to create a single golden record, and then providing access to this golden record and its cross references to business applications.

There were two distinct challenges with this approach: Implementing MDM Hubs as a back end solution took substantial time and resources; and Automation were designed and built without the needed business context at a time business users are not engaging directly with the customer The subject matter disclosed herein may allow for the real time discovery and reconciliation of information across heterogeneous data sources, and may present a common, consolidated view of the information to end users in their system of engagement, without requiring the data to be consolidated first, and may retain the user verified information in the business application in order to build the customer registry over time, as visibility is required in support of the business activities.

Approaches described herein may enable solutions to be developed and delivered significantly faster in instances a completed consolidated database is not the primary business need.

The subject matter disclosed herein may have four components: Search; PreCleansing, Matching, and Consolidation; Additional Business Rule Processing to Handle Known Exceptions; and Presentation of Consolidated Results to End Users and Instantiating Validated Content.

Search and Discovery

Data to be used for search and discovery can be obtained in a number of ways including reading a file, selecting data using a query language, call to a service, form submission, and others. A search and discovery operation may take place against a core set of consumer data that would be considered the foundation. In some cases, data provided may be used to determine if there is a core set of the foundational data that can be extracted for evaluation. In this online world the email may be a primary search value with phone number being second given how consumers can retain phone numbers even when moving to different geographies. Using these foundational values, a first cut at the foundational data can be taken to allow for performance gains by recognizing when identities have previously been encountered and consolidated. This may reduce the need to execute the remaining steps to just those instances that are new and not directly recognized as part of a known identity.

Precleansing

Inbound data may be provided in many forms through many methods as described previously. It may be important to standardize and/or validated provided data to be used in the match and consolidate features. Also, it may be important to perform these precleanse actions against any data that is persisted. Doing this may allow for an "apples to apples" matching exercise when comparing previously unseen data to the persisted set.

Considerations for Precleanse:

Name: Notoriously difficult to validate. Some possible validations may include: List of known misused words; List of curse words, may have to be in languages expected in system; Some special characters, there may be valid uses in some languages.

Email: Apply RFC 2822; Identify and eliminate known bad emails (e.g. na@na.com) Even when combined with name a large number of suspects may be returned causing performance issues; Take advantage of web-based services available to both validate the email format and check existence.

Phone: Apply RFC 3966; Identify and eliminate known bad phone numbers (e.g. 1234567899). Even when combined with name a large number of suspects may be returned causing performance issues; Take advantage of web-based services available to both validate the phone format and check existence.

Postal Address: Includes international standardization, validations, and verification; Identify and eliminate known bad addresses numbers (e.g. 123 Sesame street). Even when combined with name a large number of suspects may be returned causing performance issues; Take advantage of web-based services available to both validate the address format and check existence.

Matching

Matching may be performed using rules based on First Name, Last Name, Email, Phone, Postal address, or some combination thereof. In some implementations, the matching may be performed using rules based on other similar elements, such as device identifiers, social handles, fax number, city, state, zip code, country, a user name, identification number, identification code, internet protocol address, middle name, middle initial, or some combination thereof. Further, in some implementations, the matching may utilize third party reference systems for the matching, to obtain additional identifiers, or some combination thereof. The rules may be defined discreetly using First and Last Name in each rule. Rule definitions may be:

Name and Email: First Name Fuzzy, Do not Match Blank; and Last Name Fuzzy, Do not Match Blank; and Email Exact, Do not Match Blank.

Name and Phone: First Name Fuzzy, Do not Match Blank; and Last Name Fuzzy, Do not Match Blank; and Phone Fuzzy, Do not Match Blank.

Name and Exact Postal address: First Name Fuzzy, Do not Match Blank; and Last Name Fuzzy, Do not Match Blank; and Street Exact, Do Not Match Blank; and City Exact, Do not Match Blank; and State Exact, Match Blank; and Zip Exact, Do not Match Blank; and Country Exact, Match Blank.

Name and Fuzzy Postal address: First Name Fuzzy, Do not Match Blank; and Last Name Fuzzy, Do not Match Blank; and Street Fuzzy, Do Not Match Blank; and City Fuzzy, Do not Match Blank; and State Exact, Match Blank; and Zip fuzzy, Match Blank; and Country Exact, Match Blank.

Match rule priority may be (which may be important in first match execution illustrated later.): 1. Name and Email; 2. Name and Phone; 3. Name and Exact Postal address; and 4. Name and Fuzzy Postal address.

Discreet matching rules may allow us to separate the matching into individually performed match executions using data specific to each rule. Using name in each rule may allow us to include 2 points of juxtaposition in each matching execution. Once all discreet matching is done we may want to correlate the results to determine where there is crossover in each match set. Where there is crossover into at least one other match set we can be more confident in a decision to recognize these as part of the same identity.

The matching process may be performed like this (after precleanse is complete):

1. Match using the complete set of attributes on a single match record. The outcome of this match may inform subsequent operations of the remaining matches that may be performed. Matching rules may be executed in priority order beginning with name and email. If no match is found in name and email the matching execution may continue to execute matches until a match is found or not found. If a match is found it can then be determined which match rule had caused the match. From this, and our knowledge of the priority order of the match rules, we can be informed of what matching is still to be performed. For example, if when executing the first match we find that the match returned was from the name and exact postal address match we may know that we do not have to execute further. Whereas if there was a match returned from the name and email rule we know that we still have name, phone and postal address rules to execute.

2. Based what we know from the first matching execution and our knowledge of the priority order of the rules, the record to be matched can be adjusted to contain date pertinent to the remaining match rules. For instance, if there was a match obtained using name and email the record to be match would be adjusted so that it would no longer include email. With the adjusted record the match would again be executed. This would be performed until either all rules returned match sets or no more matches were returned.

3) Salesforce Duplicate Management may execute when attempting to persist, either update or insert, a record. When no matches are returned from a data manipulation language (DML) action to persist the record, and the action was successful, the persisted data may be removed from the database. Inserts are used, therefore the records inserted may have to be deleted.

Consolidation

The exercise of consolidation really is not a consolidation. The consolidation may be to recognize the existence, or nonexistence, of an identify and may add the new data to that identity that would have been otherwise treated as another identity, or consumer.

Results returned from the previous matching execution may be inspected. If all match rules find a match, there may be three at most due to the fact that postal address matching should return an exact match or fuzzy match not both, it may be considered a high confidence match. Results coming from two of the three match rules may be a medium confidence match. While a match resulting from a single match rule would be considered a low confidence match.

Medium and low confidence matches may be where there needs to be some consideration based on customer preferences. One such consideration might be that if the name and fuzzy postal address rule were part of the match results in a medium or low confidence match, the match may not be considered because the fuzzy matching on postal address data can be suspect at times.

Instantiating Data

New identities found, either through no matches found or low confidence thresholds, may require instantiation. In some implementations, instantiation may further be employed for establishing a high confidence match history, to allow follow on stewardship, or some combination thereof. The instantiation may represent the existence of a previously unknown identity such that it would be known from that point on. These new identities may now be available when other interactions come in and we can identify them with the now existing identity.

Further Description of Identity Consolidation

Figure 2:
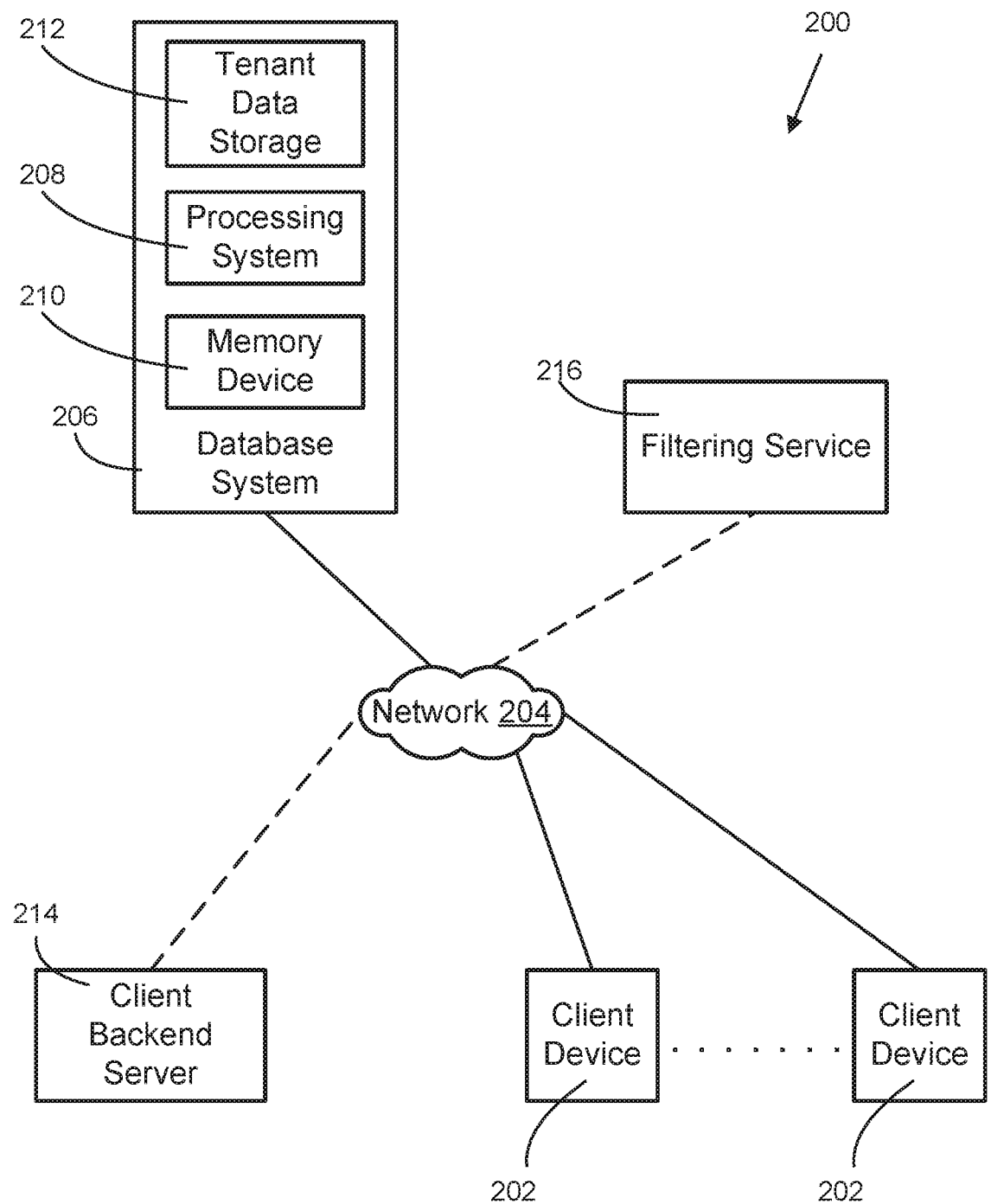
FIG. 2 illustrates a block diagram of an example environment in which identity consolidation can be performed according to some implementations.

FIG. 2 illustrates a block diagram of an example environment 200 in which identity consolidation can be performed according to some implementations. The environment 200 may include one or more client devices 202. The one or more client devices 202 may include one or more of the features of the user systems 12 (FIGS. 1A and 1B).

The client devices 202 may include computer devices utilized by a service provider, which may include individuals (such as employees) associated with the service provider. The client devices 202 may include peripherals for input from the service provider and display of graphical user interfaces to the service provider. The client devices 202 may each operate one or more computer applications with which the service provider may interact through the peripherals. In some implementations, the client devices 202 may further include one or more memory devices that may be used for storing data associated with one or more users of the service provider.

In customer service environments, the client devices 202 may be computer devices that are interacted with by customer service representatives of the service provider. The customer service representatives may enter identification information associated with a customer (i.e. user) into the client devices 202 and request display of data associated with the customer. The identification information may be obtained from the customer via telephone communication, internet communication, face-to-face communication, communication from an intermediary, or some combination thereof. The client devices 202 may display data associated with the customer based on the request.

The environment 200 may further include a network 204. The network 204 may include one or more of the features of the network 14 (FIGS. 1A and 1B). The network 204 may be coupled to one or more elements within the environment 200 and may provide for communication among the one or more elements coupled to the network 204. The client devices 202 may be coupled to the network 204 and the network 204 may provide for communication between the client devices 202 and one or more of the other elements coupled to the network 204.

The environment 200 may further include a database system 206. The database system 206 may include one or more of the features of the system 16 (FIGS. 1A and 1B). The database system 206 may be coupled to the network 204 and may communicate with the client devices 202 via the network 204.

The database system 206 may include a processing system. The processing system 208 may include one or more of the features of the processor system 17 (FIG. 1A). The processing system 208 may include one or more CPUs capable of executing computer code in any suitable computer language.

The database system 206 may further include one or more memory devices 210. The memory devices 210 may be coupled to the processing system 208. The memory devices 210 may store instructions, represented in a computer code, that may be provided to the processing system 208 and may cause the processing system 208 to perform one or more operations. The memory devices 210 may further store and persist one or more user identity entries described throughout this disclosure.

In some implementations, the database system 206 may include a tenant data storage 212. The tenant data storage 212 may include one or more of the features of the tenant data storage 22 (FIGS. 1A and 1B). The tenant data storage 212 may store data associated with the client devices 202, the service provider, users of the service provider, or some combination thereof. For example, in customer service environments, the stored data may include one or more purchase orders, repair orders, customer service interaction summaries, credit card numbers, identifiers, or some combination thereof, associated with customers of the service provider. The data stored on the tenant data storage 212 may include data stored in multiple different formats, including different software/program codes, different encrypting protocols, different compression ratios/protocols, or some combination thereof. Each of the multiple different formats may be configured to be opened or viewed by a specific computer application, such that to open or view all of the stored data may involve executing multiple different computer applications.

Each of the client devices 202 may be configured to generate a request for data associated with the user in response to an input from the service provider. The input from the service provider may include identification information associated with the user, such as a first name, last name, email address, phone number, fax number, postal address, city, state, zip code, country, or some combination thereof. In some implementations, the identification information may further include a user name, an identification number, an identification code, an internet protocol address, a middle name, a middle initial, device identifiers, social handles, other similar known identifying elements, or some combination thereof, associated with the user. Further, the request may include an indication of the desired data associated with the user to be retrieved and displayed on the client device 202.

The request generated by the client device 202 may include the identification information input by the service provider. Further, the request may include the indication of the desired data associated with user to be retrieved. The client device 202 may transmit the request, via the network 204, to the database system 206.

In response to receiving the request, the database system 206 may identify the identification information included in the request. The database system 206 may compare the identification information with the one or more user identity entries persisted on the memory device 210 of the database system 206. The user identity entries may have been persisted on the memory device 210 in response to previous requests for data associated with a user, records generated based previous user interactions, or some combination thereof. The comparison may allow the database system 206 to determine whether the user has previously interacted with the service provider and prevent the database system 206 from generating a new user identity entry if the user has previously interacted with the service provider. This can save memory space from not generating the new user identity entry.

In some implementations, the database system 206 may perform a precleanse operation on the identification information prior to comparing the identification information with the one or more user identity entries persisted on the memory device 210. As part of the precleanse operation, the database system 206 may compare the identification information with a list of known invalid entries. The list of known invalid entries may include values that are known to be faulty values for each of the fields within the identification information. For example, the list of known invalid entries may include the values of 000-000-0000 and 012-345-6789 for the phone number field. The list of known invalid entries may be configurable by the service provider, by the client devices 202, or some combination thereof.

The database system 206 may determine that one or more values within the identification information is invalid from matching of the values within the identification information with corresponding values within the list of known invalid entries. In response to determining that one or more of the values within the identification information is invalid, the database system 206 may remove the one or more values from the identification information prior to comparing the identification information with the user identity entries persisted on the memory device.

In some implementations, the environment 200 may further include a filtering service 216. The filtering service 216 may be an internet-based service provider that may identify valid entries and invalid entries in the identification information provided. In response to identifying the identification information, the database system 206 may transmit the identification information, via the network 204, to the filtering service 216.

The filtering service 216 may perform a preclensing operation on the identification information in addition to, or in lieu, of the preclensing operation performed by the database system 206. The filtering service 216 may compare the identification information with known invalid entries, with known valid entries, or some combination thereof.

From the comparison, the filtering service 216 may determine which portion of the identification information includes invalid entries, which portion of the identification information includes valid entries, or some combination thereof. In response to completion of the preclensing operation, the filtering service 216 may transmit a message to the database system 206, the message including the valid portion of the identification information, indications of the invalid portion of the identification information, indications of the valid portion of the identification information, or some combination thereof. These preclensing operations may prevent or reduce faulty determinations as to whether any of the user identity entries are associated with the user Further, in some implementations, the preclensing operations, performed by either the database system 206 or the filtering service 216, may identify common typographical errors within the identification information, may perform a spell check operation on the identification information, or some combination thereof. Based on the typographical errors or the spell check operation, the database system 206 or the filtering service 216 may correct the typographical errors or the spelling errors within the identification information prior to comparing the identification information with the user identity entries persisted on the memory device.

Comparing the identification information with the user identity entries may include comparing the identification information with one or more parameters included within the user identity entries. The one or more parameters may include first name, last name, email address, phone number, fax number, postal address, city, state, zip code, country, or some combination thereof, associated with a user identity entry. In some implementations, the parameters may further include a user name, identification number, identification code, internet protocol address, middle name, middle initial, device identifiers, social handles, other similar known identifying elements, or some combination thereof, associated with the user identity entry. Further, in some implementations, the parameters may include an identifier assigned to the specific user identity entry, alternative first names and alternative middle names (such as nicknames) for the first name and middle name associated with the user identity entry, pointers to storage locations or storage location addresses for data associated with the user, or some combination thereof. The parameters may include more elements than included in the identification information, different elements than included in the identification information, less elements than included in the identification information, the same elements included in the identification information, or some combination thereof.

For example, comparing the identification information with a user identity entry may include comparing a first name field included in the identification information of the request with the first name field in the parameters of the user identity entry. The comparison may be performed for each field in the identification information or until enough fields in the identification information have been matched with the parameters of the user identity entry to determine that the user identity entry is associated with the user to which the identification information is associated. The comparison may be performed for all of the user identity entries persisted in the memory device, or may be terminated in response to determining that one of the user identity entries is associated with the user.

In some implementations, the database system 206 may identify common misspellings, common nicknames, common synonyms, or some combination thereof, in the values for the fields in the identification information. When performing the comparison, the database system 206 may determine that values for the fields in the parameters of the user identity entry match with the corresponding values for the fields in the identification information based on the common misspellings, the common nicknames, the common synonyms, or some combination thereof. For example, the value in the first name field of the identification information may be 'Jon' and the database system 206 may determine that it is a match to the value 'Jonathan' in the first name field for the parameters of the user identity entry based on 'Jon' being a common nickname for 'Jonathan'. In some implementations, matching based on the common misspellings, common nicknames, common synonyms, or some combination thereof, may be considered as fuzzy matching.

In some implementations, the database system 206 may determine the user identity entry is associated with the user based on determining one or more fields of the identification information are equal to corresponding fields in the user identity entry. In some implementations, the database system 206 may have a priority protocol for the matching the fields to determine which user identity entry is associated with the user. For example, in some implementations, the priority protocol may define that the database system 206 should first search for a user identity entry with name (first name and last name) and email fields that match the name and email fields of the identification information. In some implementations, the priority protocol may further define whether fields are determined to be matched for exact matches of field values or if a fuzzy match of the field values can be used for determining whether the fields are matched.

If the database system 206 determines that none of the user identity entries have name and email fields that are equal to the name and email fields of the identification information, the priority protocol may define that the database system 206 should then search for a user identity entry with name and phone number fields that are equal to the name and phone number fields of the identification information. In some implementations, the priority protocol may be configurable by the service provider, the client devices 202, or some combination thereof. If the database system 206 proceeds to the end of the priority protocol without finding a user identity entry with the defined fields equal to identification information, the database system 206 may determine that none of the persisted user identity entries are associated with the user and the user is likely a new user to the service provider.

If, from the comparison, one of user identity entries is determined to be associated with the user, the database system 206 may compare the fields included in the identification information of the request with the fields included in the parameters of the user identity entry. If, based on the comparison of fields, the database system 206 determines that the identification information includes additional fields not included in the parameters, the database system 206 may add the additional fields to the parameters of the user identity entry and store the corresponding values from the identification information. For example, if the identification information includes an email address field for a user and the parameters of the user identity entry do not include an email address field, an email address field may be added to the parameters of the user identity entry and the value of the email address field from the identification information may be stored for the email address field of the parameters.

In some implementations, the fields included in the parameters of the user identity entries may be configurable, with each of the user identity entries including the same fields. The fields to be included in the parameters may be configured by the service provider. Fields without values may be assigned a default value or a null value to indicate that there is currently no value for the field. If, based on the comparison of fields, it is determined that the identification information includes a value for a field corresponding to a field of the parameters of the user identity entry, determined to be associated with the user associated with the request, that is assigned the default value or the null value, the database system 206 may update the field of the parameters with the value from the identification information.

If, from the comparison, none of the user identity entries persisted on the memory device 210 are determined to be associated with the user, the database system 206 may instantiate a new user identity entry that is stored and persisted on the memory device 210. The new user identity entry may be instantiated with parameters equal to the identification information, or some portion thereof. In this situation, the new user identity entry is considered to be associated with the user for the further operations performed by the database system 206 in response to receiving the request from the client device 202.

The database system 206 may query a backend database associated with the client device 202, the service provider, or some combination thereof, that generated the request. The backend database may be stored in the tenant data storage 212 of the database system 206. The backend database may include any of the data described above as being able to be stored on the tenant data storage 212.

The database system 206 may query the backend database using one or more of the parameters included in the user identity entry determined to be associated with the user. The database system 206 may determine the parameters to be used for the query and the format of the query based on the formats of the data stored in the backend database. Using the one or more parameters included in the user identity entry may allow the database system 206 to retrieve more records, records more likely associated with the user, or some combination thereof, than if the database system 206 was to query the backend database with the identification information.

The database system 206 may initiate multiple queries of the backend database with each query including different parameters, different formats, or some combination thereof. Each query may be configured for a specific data format, a specific computer application, or some combination thereof. In some implementations, each query may cause an instantiation of the corresponding specific computer application and utilize the computer application to return the data for the query.

In some implementations, the backend database may be located on a computer device or memory device, which is located remotely to the database system 206. For example, a client backend server 214 may store the backend database. The database system 206 may communicate with the client backend server 214 via the network 204. The database system 206 may query the backend server 214 for the data associated with the user. Further, in some implementations, the database system 206 may query both the tenant data storage 212 and the client backend server 214 for the data associated with the user. In still further implementations, there may be multiple client backend servers 214, where the multiple client backend servers 214 may all be associated with the service provider or a portion of the multiple client backend servers 214 may be associated with a different service provider from the service provider that initiated the request. Accordingly, the database system 206 may provide more comprehensive data than if the database system 206 was to query a single backend database.

The database system 206 may obtain one or more records from the backend database that include data associated with the user from the query. The records may be associated with orders, such as customer service orders, purchase orders, service requests, or some combination thereof. The database system 206 may generate a view of the data associated with user that includes the data of the obtained records. Further, the view may include one or more of the parameters from the user identity entry associated with the user. The view may include portions of the data associated with the user, portions of the parameters, or some combination thereof, defined by a predetermined view protocol. The predetermined view protocol may be configurable by the service provider, the client devices 202, or some combination thereof.

Further, the view may portray the data in a single format. The single format may be predetermined and may be configurable by the service provider, the client devices 202, or some combination thereof. In instances where the data, or a portion thereof, is not stored in the single format when retrieved, the database system 206 may convert the data to the single format when generating the view.

The database system 206 may transmit the view to the client device 202 that generated the request. In some implementations, the database system 206 may further persist a copy of the view in the memory device 210, the tenant database 212, or the client backend server 214 and may provide the view in response to receiving subsequent requests associated with the user. In response to receiving the view, the client device 202 may display the view on a display of the client device 202.

Figure 3:
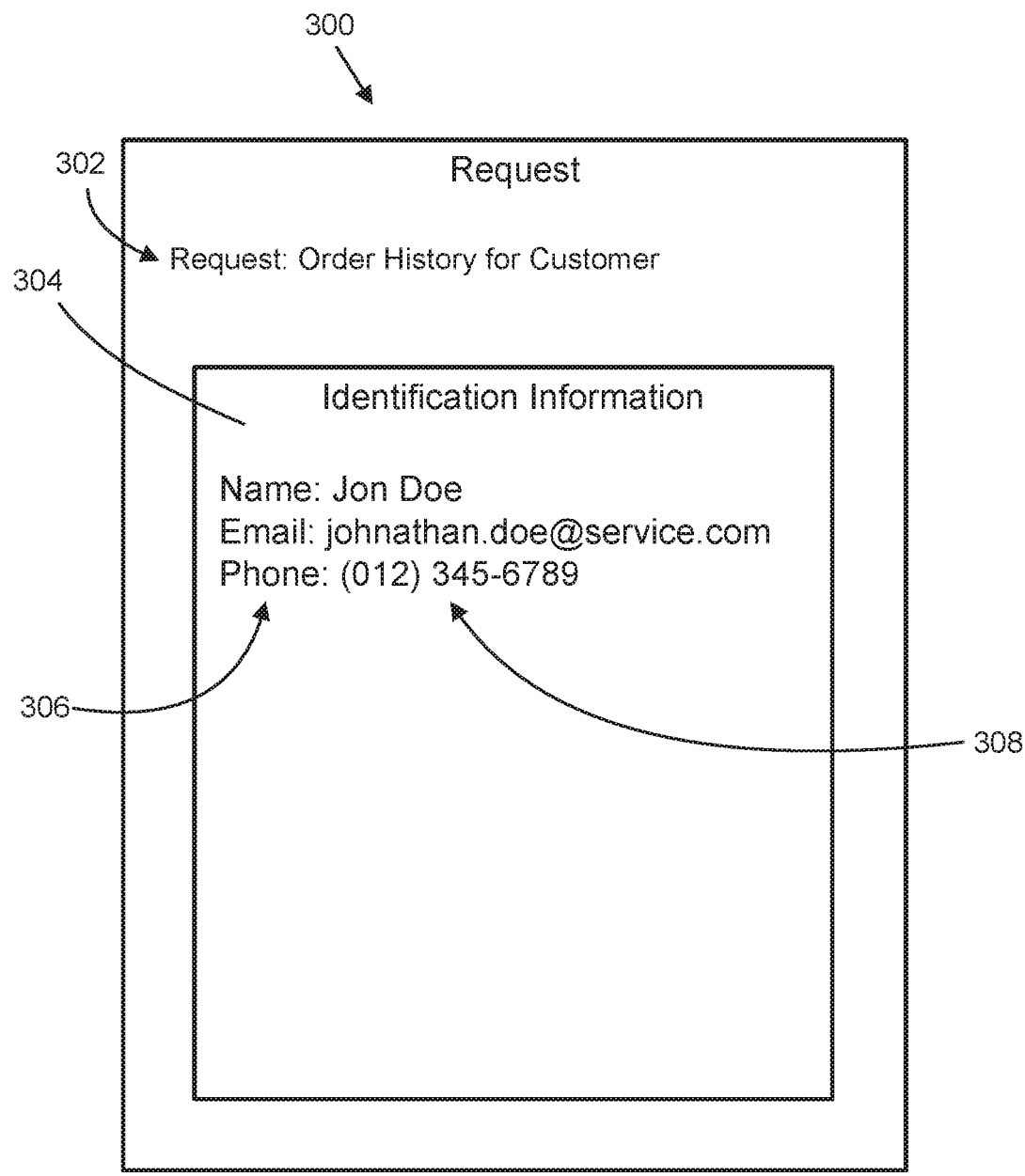
FIG. 3 illustrates an example request for user data according to some implementations.

FIG. 3 illustrates an example request 300 for user data according to some implementations. The request 300 may be an example of the request described in relation to FIG. 2. The request 300 may be transmitted from one of the client devices 202 (FIG. 2) to the database system 206 (FIG. 2) via the network 204 (FIG. 2).

The request 300 may include an indication 302 of data to be returned to the client device 202 in response to the request 300. The data to be returned may include the data associated with a user as described in relation to FIG. 2. The indication 302 illustrated is for an order history of a customer. The data to be returned may be configurable by a service provider, the client device 202, or some combination thereof. The data to be returned may be an order history of a user, a service request history of a user, a browsing history of a user, similar data associated with a user, or some combination thereof.

The request 300 may further include identification information 304. The identification information 304 may include one or more fields 306 with corresponding values 308 associated with the user to which the request 300 is directed. The identification information 304 illustrated includes name, email address, and phone number fields and corresponding name, email address, and phone number values. It is to be understood that the identification information 304 may include fields and values corresponding to any of the elements included in the identification information described in relation to FIG. 2, including, but not limited to, first name, last name, email address, phone number, fax number, postal address, city, state, zip code, country, or some combination thereof, associated with the user.

Figure 4:
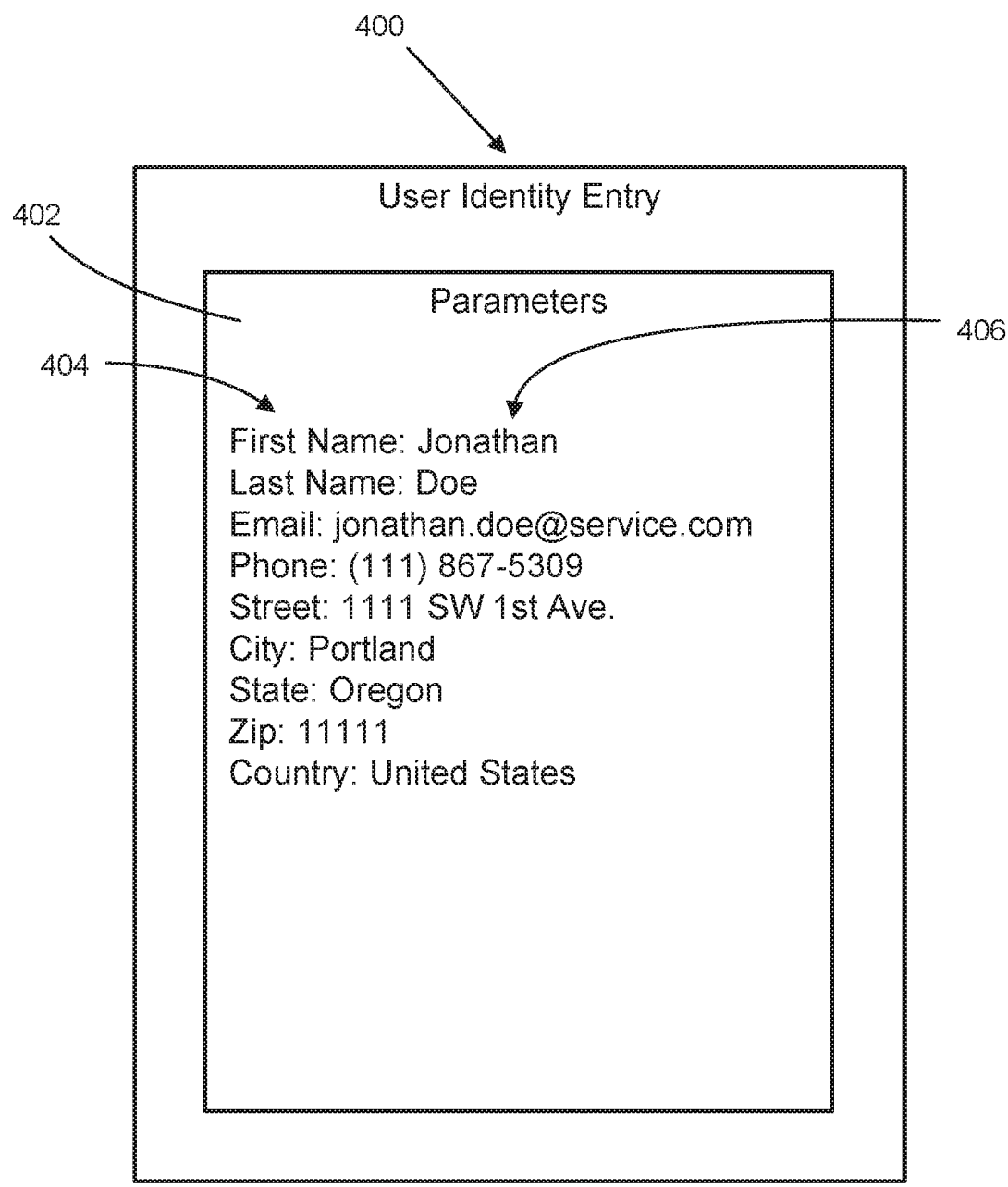
FIG. 4 illustrates an example user identity entry according to some implementations.

FIG. 4 illustrates an example user identity entry 400 according to some implementations. The user identity entry 400 may be an example of one of the user identity entries described in relation to FIG. 2. The user identity entry 400 may be persisted on a memory device, such as the memory device 210 (FIG. 2) of the database system 206 (FIG. 2).

The user identity entry 400 may correspond to a user, such as the user described in relation to FIG. 2. The user identity entry 400 may include one or more parameters 402 associated with the user. The parameters 402 may include one or more fields 404 and corresponding values 406 for each of the fields. The fields 404 included in the parameters 402 may be configurable by a service provider, the client devices 202 (FIG. 2), or some combination thereof.

In the illustrated example, the user identity entry 400 may be associated with a user to which the request 300 (FIG. 3) is directed. In particular, a database system, such as the database system 206 (FIG. 2) may determine that the user identity entry 400 is associated with the user of the request from a comparison of the identification information 304 (FIG. 3) with the user identity entry 400. The database system may make this determination based on the name field value and the email address value of the identification information 304 matching the first name field value, the last name field value, and the email address value of the parameters 402. The database system may parse the name field value of the identification information into a first name value and a last name value for comparison with the parameters 402. It is to be understood that the database system may parse any field in the identification into corresponding fields included in the parameters 402 of the user identity entry 400. The database system may further determine that 'Jon' in the name field of the identification information 304 is a nickname for 'Jonathan' in the first name field of the parameters 402 and, accordingly, determine that 'Jon' is a fuzzy match with 'Jonathan.'

In the illustrated example, it may be noted that the phone field value of the identification information 304 is different than the phone field value of the parameters 402. In some implementations, the priority protocol for the comparing may have been defined such that the first name, last name, and email address field values being matched was sufficient for determining that the user identity entry was associated for the user. The phone field value of the identification information 304 and the phone field value of the parameters 402 may not have been compared as the first name, last name, and email field values were determined to be matching prior to comparing the phone field values, or the comparison may have been disregarded based on the matching of the first name, last name, and email field values. Further, in some implementations that include a precleansing operation (as described in relation to FIG. 2), the phone field of the identification information 304 may have been determined to be an invalid entry and may have been removed from the identification information 304 prior to comparing with the user identity entry 400.

Further, in the illustrated example, it may be noted that the parameters 402 have additional fields (phone, street, city, state, zip, and country fields in the illustrated example) not included in the identification information 304. It is to be understood that the parameters 402 may include more fields, less fields, different fields, or some combination thereof, than included in the identification information 304.

Figure 5:
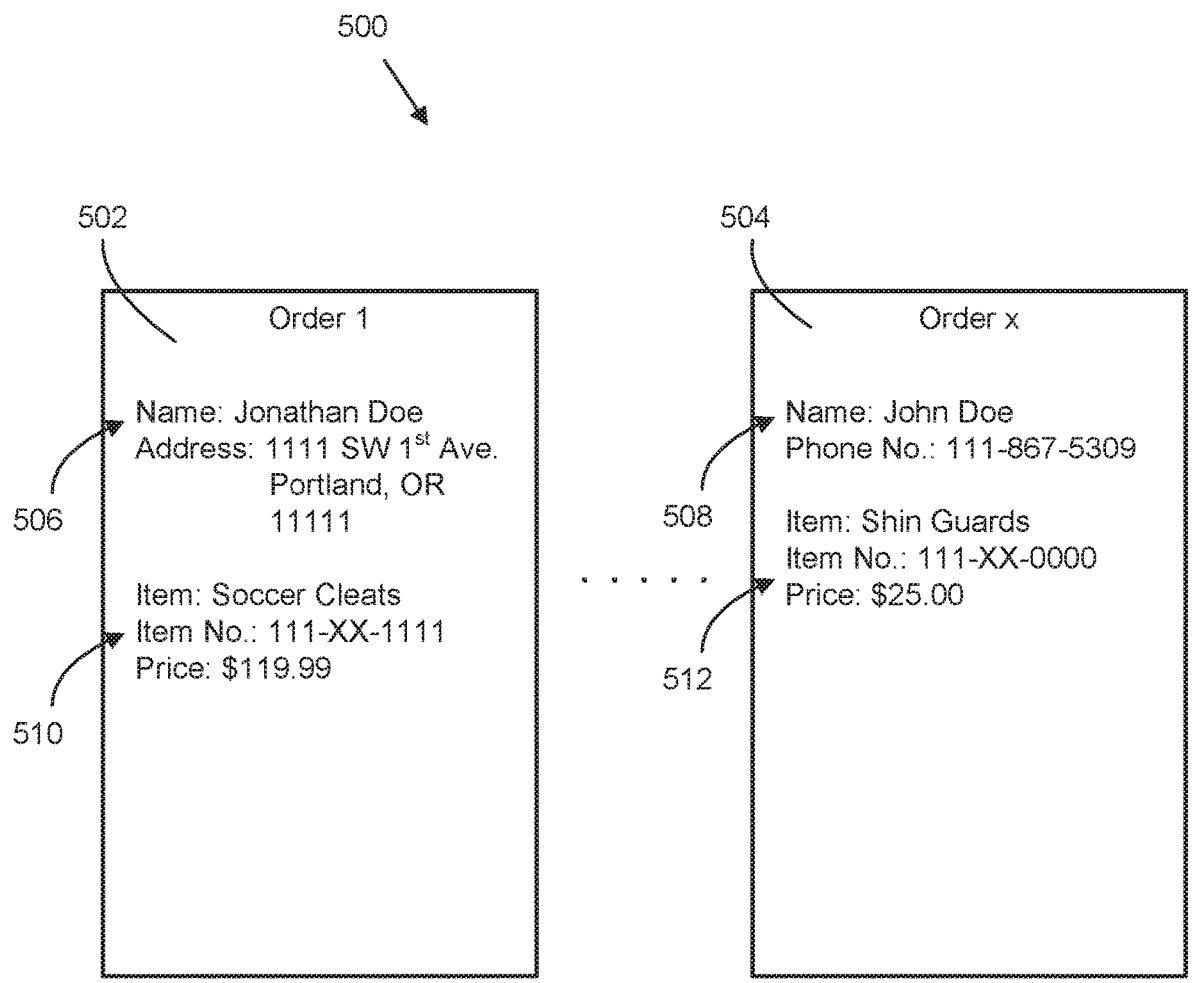
FIG. 5 illustrates example orders for an identified user according to some implementations.

FIG. 5 illustrates example orders 500 for an identified user according to some implementations. The orders 500 may be an example of the data associated with the user retrieved by the database system 206 (FIG. 2) from querying the backend database. The orders 500 may include any of the requested data associated with the indication 302 (FIG. 3), including orders of a user for generating an order history, service requests of a user for generating a service request history, websites visited by a user for generating a browsing history of a user, similar data associated with a user, or some combination thereof.

In the illustrated example, the orders 500 include a first order 502 and a second order 504. The first order 502 and the second order 504 may have been retrieved by a database system, such as database system 206 (FIG. 2), by querying a backend database, such as the backend database stored on the tenant data storage 212 (FIG. 2), the backend database stored on the client backend server 214 (FIG. 2), or some combination thereof. The database system may have queried the backend database using the fields 404 (FIG. 4) of the parameters 402 (FIG. 4). The database system may have queried the backend database for records stored on the backend database that included one or more of the fields 404 and corresponding values 406 of the parameters 402. In some implementations, the database system may have determined that certain records stored on the backend database included common misspellings, common nicknames, common synonyms, or some combination thereof, of the values 406 of the parameters 402 and may retrieve the records. Further, in some implementations, the fields 404 utilized for the query may be predetermined.

Each order of the orders 500 may include a set of fields associated with a user that placed the order. The first order 502 may include a first set of fields 506 associated with a user that placed the first order 502 and the second order 504 may include a second set of fields 508 associated with the user that placed the second order 504. In the illustrated example, the first order 502 may have been retrieved based on the first name, last name, street, city, state, and zip code field values of the parameters 402 and the first set of fields 506 being equal, and the second order 504 may have been retrieved based on the first name field value being a fuzzy match, and the last name and phone number field values of the parameters 402 and the second set of fields 508 being equal.

In some implementations, one or more rules may be defined for determining which orders are to be retrieved. The rules may provide certain field values or certain combinations of field values that are to be matched between the parameters 402 and the orders 500 for an order to be retrieved. The rules may be predetermined. In some implementations, the rules may be configurable by a service provider, client devices (such as the client devices 202 (FIG. 2)), or some combination thereof.

Each order of the orders 500 may further include information related to the item or items included in the order. The first order 502 may include a first set of information 510 for soccer cleats ordered by the user and the second order 504 may include a second set of information 512 for shin guards ordered by the user. While the first set of information 510 and the second set of information 512 are illustrated as including item, item number, and price fields, it is to be understood that the information is not limited to these fields and may include other fields related to the item or items, including manufacturer, model, quantity, date of order, status of order, or some combination thereof.

Figure 6:
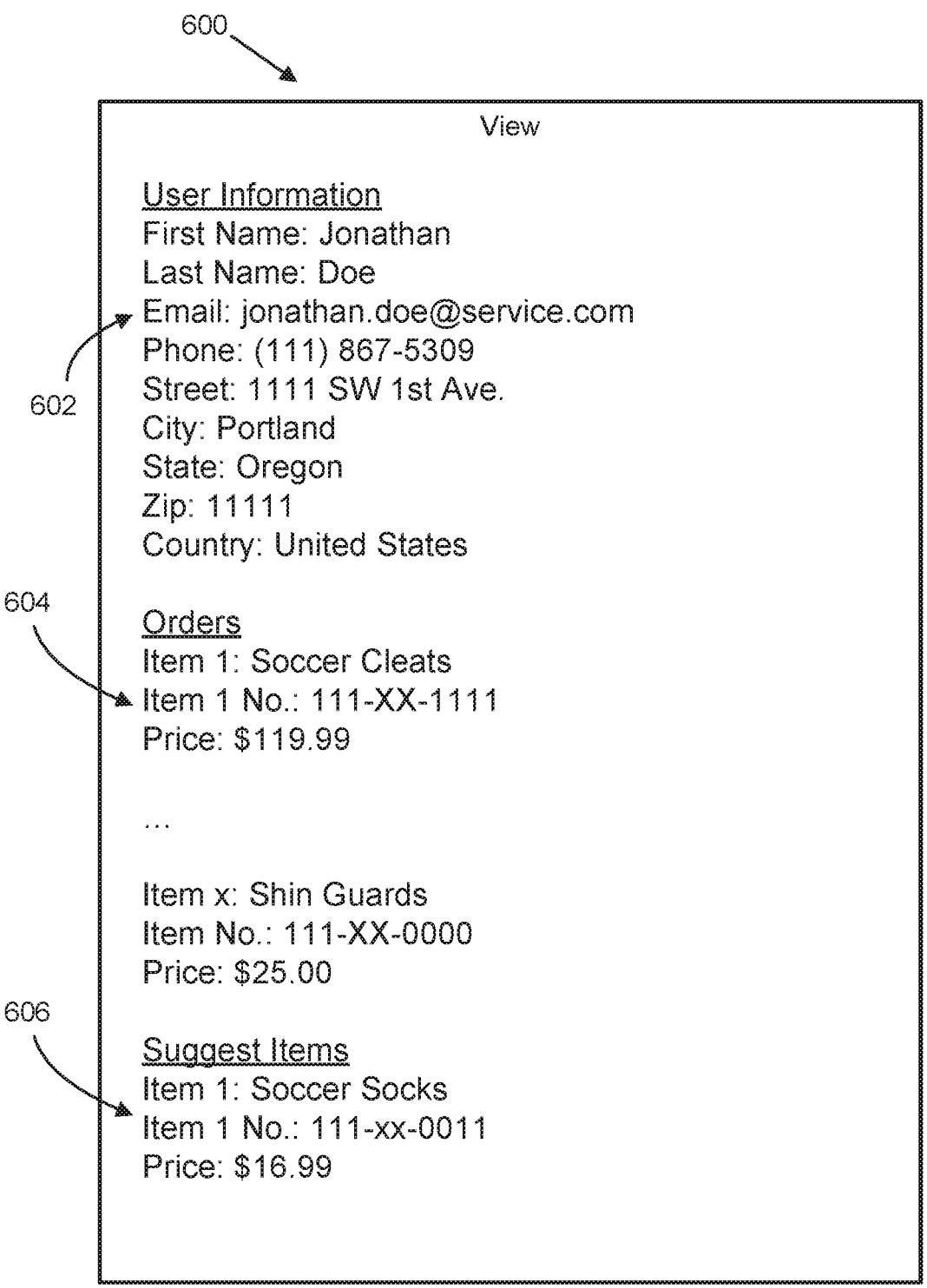
FIG. 6 illustrates a view of data associated with a user according to some implementations.

FIG. 6 illustrates a view 600 of data associated with a user according to some implementations. The view 600 may be an example view of the view described in relation to FIG. 2 and may be generated by the database system 206 (FIG. 2). The view 600 may be generated in response to the request 300 (FIG. 3), and may be based on the user identity entry 400 (FIG. 4) and the orders 500 (FIG. 5). The view 600 may be transmitted by a database system (such as database system 206) to a client device (such as the client devices 202 (FIG. 2)) that generated the request 300, the view 600 transmitted for display on the client device.

The view 600 may include user information 602 associated with the user for which data is to be returned as indicated in the request 300. The user information 602 may include one or more of the fields 404 (FIG. 4) and the corresponding values 406 (FIG. 4) of the parameters 402 (FIG. 4) for the user identity entry 400 (FIG. 4). In some implementations, the user information 602 may include the fields 306 (FIG. 3) and the corresponding values 308 (FIG. 3) of the identification information 302 (FIG. 3) rather than the fields 404 (FIG. 4) and the corresponding values 406 (FIG. 4).

The view 600 may further include the retrieved data 604 associated with the user of the request. In the illustrated examples, the retrieved data 604 may include the first set of information 510 (FIG. 5) related to the soccer cleats in the first order 502 (FIG. 5) and the second set of information 512 (FIG. 5) related to the shin guards in the second order 504 (FIG. 5). The retrieved data 604, such as the first set of information 510 and the second set of information 512 illustrated, may be displayed in a single format in the view 600. If the retrieved data 604 associated with the user is retrieved, or stored, in more than one format or a different format than the single format, the retrieved data 604 may be converted into the single format for display in the view 600 as part of generating the view 600. The single format may include a certain order of the retrieved data 604 for display in the view 600, a certain portion of the retrieved data 604 to be displayed in the view 600, certain fields of the retrieved data 604 to be displayed in the view 600, or some combination thereof. The single format may be configurable by a service provider, a client device (such as the client devices 202 (FIG. 2)), or some combination thereof.

In some implementations, the view 600 may include suggestion information 606. The suggestion information 606 may include suggestions based on the retrieved data 604. The database system may analyze the retrieved data 604 and may determine, based on the analysis of the retrieved data 604, that one or more suggestions should be included in the view 600. In the illustrated example, the database system may have determined, based on the first order 502 being for soccer cleats and the second order 504 being for shin guards, that suggestion information 606 for soccer socks should be included in the view 600. Whether suggestion information 606, and what suggestion information, is to be included in the view 600 may be configurable by a service provider, a client device (such as the client devices 202), or some combination thereof.

Figure 7A:
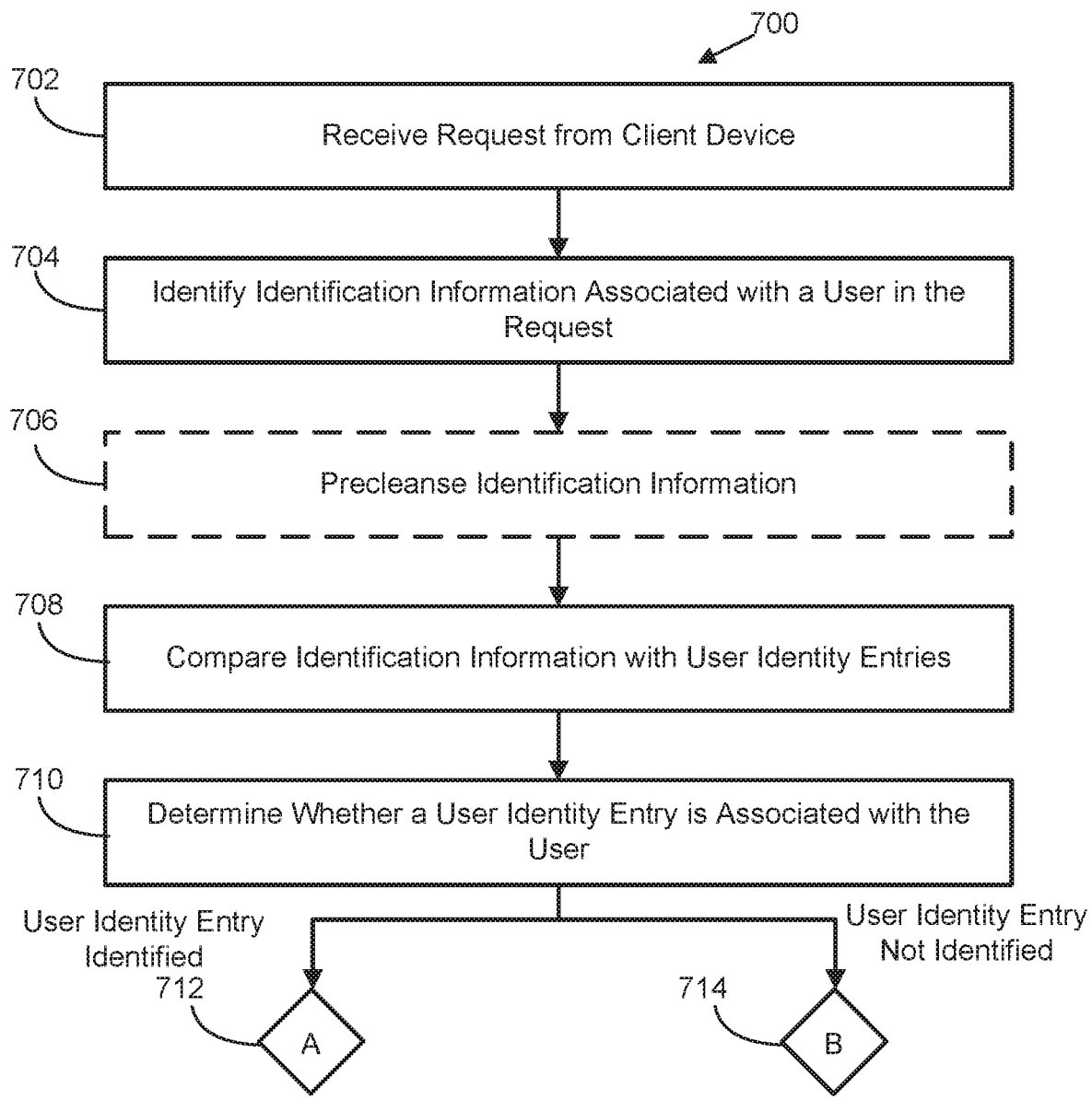
FIG. 7A illustrates a first portion of an example process according to some implementations.
Figure 7B:
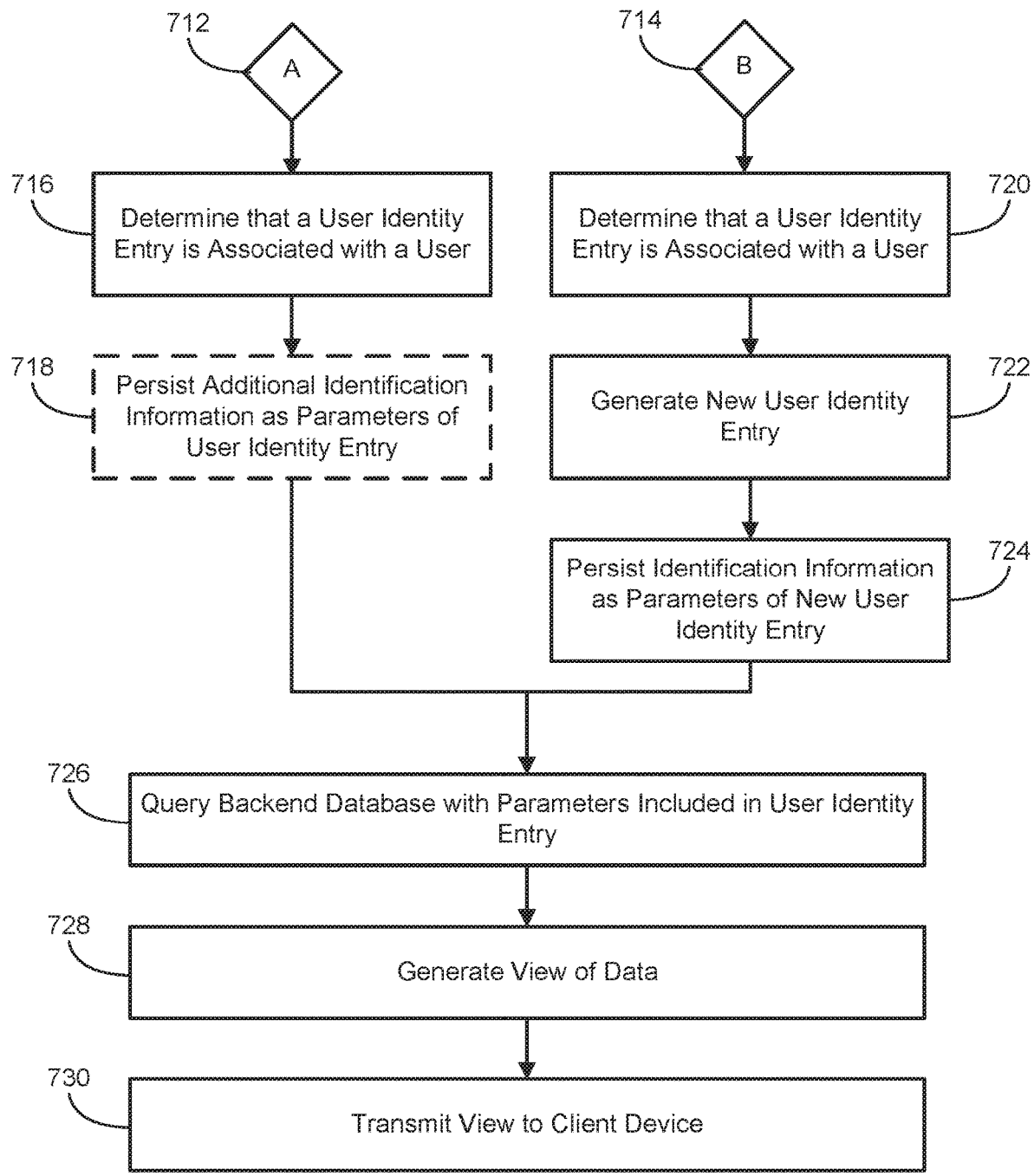
FIG. 7B illustrates a second portion of the example process of FIG. 7A according to some implementations.

FIGS. 7A and 7B illustrate an example process 700 according to some implementations. The process 700 may be performed by a database system, such as the database system 206 (FIG. 2).

In 702, the database system may receive a request from a client device, such as the client devices 202 (FIG. 2). The request may include one or more of the features of the request described in relation to FIG. 2, the request 300 (FIG. 3), or some combination thereof. The request may include an indication of data to be returned to the client device and identification information for a user associated with the data to be returned.

In 704, the database system may identify the identification information associated with the user in the received request. The identification information may include one or more of the features of the identification information described in relation to FIG. 2, the identification information 304 (FIG. 3), or some combination thereof.

In 706, a precleanse operation may be performed on the identification information. The precleanse operation may include one or more of the features of the precleanse operations described in relation to FIG. 2 and may result in a portion of the identification information being removed. The precleanse operation may be performed by the database system or may be performed by a filtering service (such as filtering service 216 (FIG. 2)), as described in relation to FIG. 2. In some implementations, the precleanse operation may be omitted.

In 708, the database system may compare the identification information with user identity entries persisted on a memory device (such as memory device 210 (FIG. 2) of the database system, such as the user identity entries described in relation to FIG. 2, the user identity entry 400 (FIG. 4), or some combination thereof. Comparing the identification information with the user identity entries may include comparing values of the fields in the identification information with values of the fields in the user identity entries to determine if the values match (are equal) or are fuzzy matches.

In 710, the database system may determine whether a user identity entry of the user identity entries is associated with the user. The database system may determine user identity entry is associated with the user from the comparison of the identification information with the user identity entries. The user identity entry may be determined to be associated with the user identity based on the values of the fields in the identification information matching, fuzzy matching, or some combination thereof, with the values of the fields in the user identity entry. In some implementations, a priority protocol (such as the priority protocol described in relation to FIG. 2) may be utilized for determining whether a user identity is associated with the user. If a user identity entry is identified as being associated with the user, the process 700 continues to 716, via off-sheet connector 712. If it is determined that none of the user identities persisted on the memory device are associated with the user, the process 700 continues to 714, via off-sheet connector 714.

In 716, the database system determines that the user identity entry is associated with the user. In some implementations, 716 may further compare the identification information with the parameters (such as the parameters described in relation to FIG. 2, the parameters 402 (FIG. 4), or some combination thereof) of the user identity entry to determine if additional information is included in the identification information that is not included in the parameters. The database system may compare the fields of the identification information with the fields of the parameters to determine if any additional fields are included in the identification information that is not included in the parameter.

In 718, the database system may persist the additional identification information within the parameters of the user identity entry. The database system may add the additional fields and corresponding values included in the identification information to the fields included in the parameters of the user identity entry. The process 700 may continue to 726.

In 720, the database system may determine that none of the user identity entries persisted in the memory device of the database system are associated with the user. The database system may base the determination from the comparison of the identification information with the user identity entries.

In 722, the database system may generate a new user identity entry based on the received request. Based on the determination that none of the user identity entries persisted on the memory device are associated with the user of the received request, the database system may determine that the user is a new user to the service provider. The new user identity entry may be determined as being associated with the user of the received request in response to the generation of the new user identity.

In 724, the database system may persist the identification information as parameters of the new user identity entry. The database system may persist the fields and corresponding values of the identification information as the parameters of the new user identity entry. In some implementations, the database system may persist the fields and corresponding values corresponding to fields configured to be persisted within user identity entries and not persist other fields and corresponding values of the identification information. The process 700 may continue to 726.

In 726, the database system may query a backend database with the parameters included in the user identity entry determined to be associated with the user of the request. The query may be performed in accordance with one or more of the features of querying described in relation to FIG. 2, querying and return of data described in relation to FIG. 5, or some combination thereof. The database system may query a backend database stored on a tenant data storage (such as tenant data storage 212 (FIG. 2)), a client backend server (such as client backend server 214 (FIG. 2)), or some combination thereof. The query may return data associated with the user of the request to the database system.

In 728, the database system may generate a view of the data associated with the user. The view may include one or more of the features of the view described in relation to FIG. 2, the view 600 (FIG. 6), or some combination thereof. The view may include the parameters of the user identity entry associated with the user, the data associated with the user, suggestions based on the data associated with the user, some portion thereof, or some combination thereof.

In 730, the database system may transmit the view to the client device that generated the request. The client device may display the view on a display of the client device in response to receiving the view. In some implementations, the database system may further persist a copy of the view in the memory device, the tenant database, or the client backend server and may provide the view in response to receiving subsequent requests associated with the user.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:
1. A database system, comprising:
a processing system; and
a memory device coupled to the processing system, the memory device including instructions stored thereon that, when executed by the processing system, cause the database system to:
identify identification information associated with a user within a request, received from a client device, for data associated with the user, wherein the identification information comprises a plurality of fields;
compare the fields of identification information to a list of invalid entries;

determine, from the comparison of the fields identification information with the list of invalid entries, that an entry in a first field of the identification information is invalid;

remove the invalid entry from the first field of the identification information prior to comparing the identification information with user identity entries persisting on the memory device;

determine, from the comparison, that a user identity entry persisting on the memory device is associated with the user;

query a backend database associated with the client device with one or more parameters included within the user identity entry to obtain the data associated with the user;

generate a view of the data associated with the user, wherein the data associated with the user is stored in a plurality of records on the backend database, wherein at least two of the plurality of records are stored in different formats on the backend device, wherein generating the view includes converting at least one of the records into a single format, and wherein the data of the view is displayed in the single format; and transmit, to the client device, the view for display on the client device.

2. The database system of claim 1, wherein querying the backend database includes initiating multiple queries, each of the multiple queries for different formats of the data associated with the user.

3. The database system of claim 1, wherein the view further includes at least one of the one or more parameters included within the user identity entry.

4. The database system of claim 1, wherein the instructions are further operable to:

determine, from the comparison, that a portion of the identification information is not included in the one or more parameters of the user identity entry; and update the one or more parameters of the user identity entry to include the portion of the identification information in response to determining that the portion is not included in the one or more parameters.

5. The database system of claim 1, wherein the instructions are further operable to:

determine, from the comparing, that none of the user identity entries persisting on the memory device are associated with the user;

generate an additional user identity entry in response to determining that none of the user identity entries persisting on the memory device are associated with the user, the additional user identity entry including the identification information; and persist the additional user identity entry on the memory device, wherein determining that a user entry persisting on the memory device is associated with the user includes determining that the additional user identity entry is associated with the user.

6. The database system of claim 1, wherein the identification information includes one or more of a name, an email address, a phone number and a postal address associated with the user.

7. The database system of claim 1, wherein the user identity entry persisting on the memory device includes one or more of a name, an email address, a phone number, and a postal address associated with the user identity entry.

8. The database system of claim 1, wherein the instructions are further operable to:

query a second backend database not associated with the client device with the one or more parameters included within the user identity to obtain additional data associated with the user.

9. The database system of claim 8, wherein the instructions are further operable to:

generate a view including the data associated with the user and the additional data associated with the user, the view including the data associated with the user and the additional data associated with the user displayed in a single format; and transmit, to the client device, the view for display on the client device.

10. A method, comprising:

identifying, by a database system within a request received from a client device, identification information associated with a user, the request for data associated with the user, wherein the identification information comprises a plurality of fields;

comparing, by the database system, the fields of identification information to a list of invalid entries;

determining, by the database system from the comparison of the fields identification information with the list of invalid entries, that an entry in a first field of the identification information is invalid;

removing, by the database system, the invalid entry from the first field of the identification information prior to comparing, by the database system, the identification information with user identity entries persisting on a memory device;

determining, from the comparison by the database system, that a user identity entry, of the user identity entries, is associated with the user;

querying, by the database system, a backend database with one or more parameters included within the user identity entry to obtain the data associated with the user;

generating, by the database system, a view of the data associated with the user, wherein the data associated with the user is stored in a plurality of records on the backend database, wherein at least two of the plurality of records are stored in different formats on the backend device, wherein generating the view includes converting at least one of the records into a single format, and wherein the data of the view is displayed in the single format; and transmitting, by the database system to the client device, the view for display on the client device.

11. The method of claim 10, further comprising:

determining, from the comparison, that a portion of the identification information is not included in the one or more parameters included within the user identity entry; and adding, in response to determining that the portion of the identification information is not included in the one or more parameters, the portion of the identification information to the one or more parameters included within the user identity entry.

12. A non-transitory computer-readable medium storing instructions that, when executed by a processor, cause a database system to:

identify identification information associated with a user within a request, received from a client device, for data associated with the user, wherein the identification information comprises a plurality of fields;

compare the fields of identification information to a list of invalid entries;

determine, from the comparison of the fields identification information with the list of invalid entries, that an entry in a first field of the identification information is invalid;

remove the invalid entry from the first field of the identification information prior to comparing the identification information with user identity entries persisting on a memory device;

determine, from the comparison, that a user identity entry persisting on the memory device is associated with the user;

query a backend database associated with the client device with one or more parameters included within the user identity entry to obtain the data associated with the user;

generate a view of the data associated with the user, wherein the data associated with the user is stored in a plurality of records on the backend database, wherein at least two of the plurality of records are stored in different formats on the backend device, wherein generating the view includes converting at least one of the records into a single format, and wherein the data of the view is displayed in the single format; and transmit, to the client device, the view for display on the client device.

13. The non-transitory computer-readable medium of claim 12, wherein querying the backend database includes initiating multiple queries, each of the multiple queries for different formats of the data associated with the user.

14. The non-transitory computer-readable medium of claim 12, wherein the view further includes at least one of the one or more parameters included within the user identity entry.

15. The non-transitory computer-readable medium of claim 12, wherein the medium further stores instructions to:

determine, from the comparison, that a portion of the identification information is not included in the one or more parameters of the user identity entry; and update the one or more parameters of the user identity entry to include the portion of the identification information in response to determining that the portion is not included in the one or more parameters.

16. The non-transitory computer-readable medium of claim 12, wherein the medium further stores instructions to:

determine, from the comparing, that none of the user identity entries persisting on the memory device are associated with the user;

generate an additional user identity entry in response to determining that none of the user identity entries persisting on the memory device are associated with the user, the additional user identity entry including the identification information; and persist the additional user identity entry on the memory device, wherein determining that a user entry persisting on the memory device is associated with the user includes determining that the additional user identity entry is associated with the user.

\* \* \* \* \*